Figure 1:
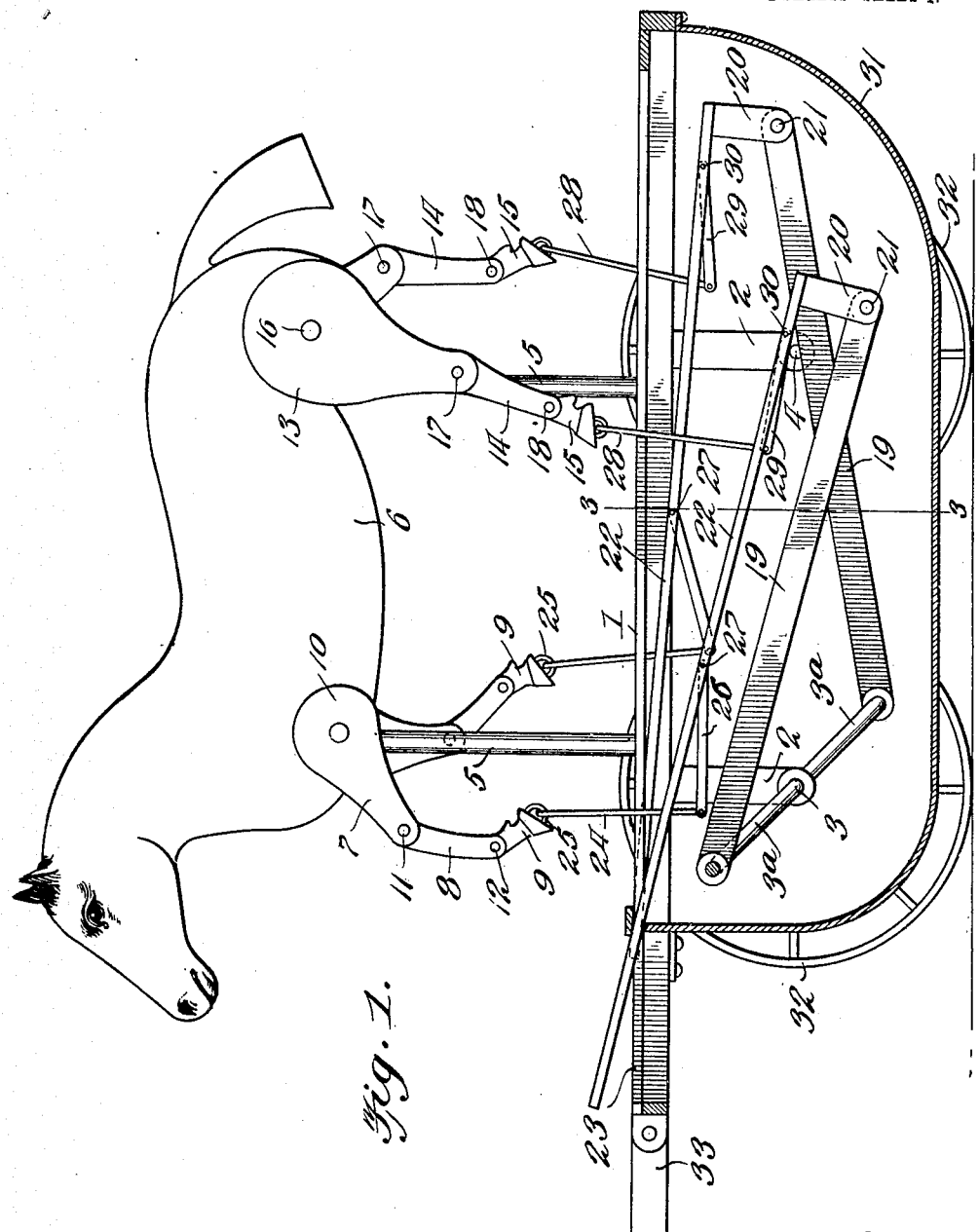

T. HARRIS.
TOY.
APPLICATION FILED JULY 1, 1908.

912,844.

Patented Feb. 16, 1909.

2 SHEETS—SHEET 1.

Witnesses
Frank B. Hoffman
F. P. Bringea

Inventor
Thomas Harris
By Victor J. Evans
Attorney

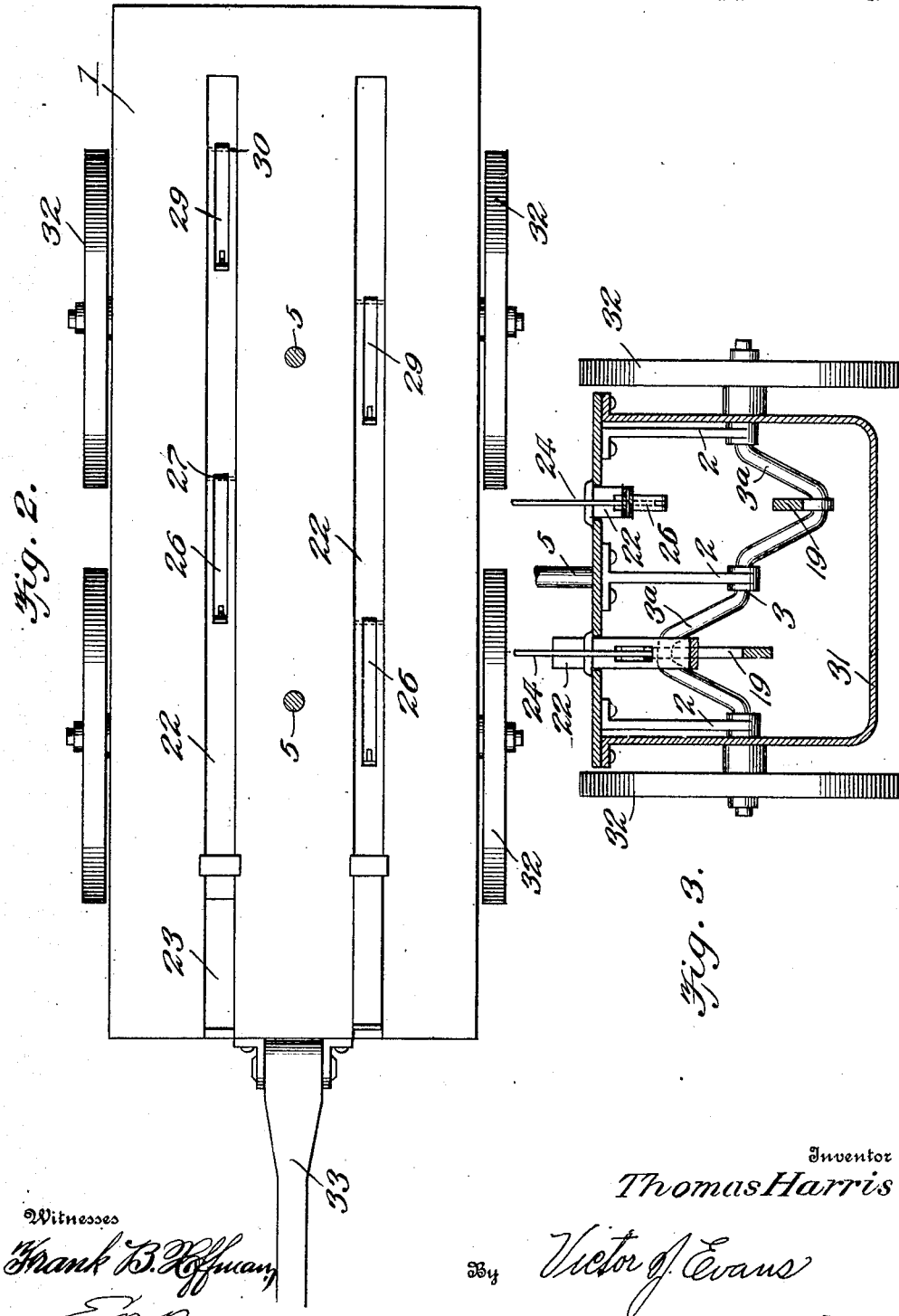

UNITED STATES PATENT OFFICE.

THOMAS HARRIS, OF SCRANTON, PENNSYLVANIA.

TOY.

No. 912,844.　　　Specification of Letters Patent.　　　Patented Feb. 16, 1909.

Application filed July 1, 1908. Serial No. 441,333.

*To all whom it may concern:*

Be it known that I, THOMAS HARRIS, a citizen of the United States of America, residing at Scranton, in the county of Lackawanna and State of Pennsylvania, have invented new and useful Improvements in Toys, of which the following is a specification.

This invention relates to toys, and one of the principal objects of the same is to provide a wheeled frame with an imitation horse mounted thereon and to provide connections between the wheels and feet of the horse, whereby the natural movements of the legs of the horse are given in the movements of the toy.

Another object of the invention is to provide an automatic toy in which the figure of a horse is mounted upon a wheeled frame, and the legs of the horse are connected to a double crank axle of the wheeled frame, said legs being jointed and movable to imitate the natural movements of the legs of a horse.

These and other objects may be attained by means of the construction illustrated in the accompanying drawings, in which,—

Figure 1 is a side elevation and partial section made in accordance with my invention. Fig. 2 is a plan view of the frame of the toy, the standards for supporting the horse being shown in section. Fig. 3 is a transverse vertical section on the line 3—3 of Fig. 1.

Referring to the drawings, the numeral 1 designates a platform having depending brackets or hangers 2 in which are mounted the front axle 3 and the rear axle 4. Rising from the platform 1 are the standards 5, and supported upon these standards is the figure of a horse. The front legs are each composed of three sections 7, 8 and 9, and said sections 7 are pivoted to the body of the horse, as at 10, and the sections 8 and 9 are pivotally connected at 11 and 12. The hind legs of the horse are each composed of three sections 13, 14 and 15, the section 13 being pivoted to the horse, as at 16, and the sections 14 and 15 being pivoted together, as at 17 and 18.

The front axle 3 of the vehicle is provided with double cranks 3ª, said cranks being oppositely disposed, and pivotally connected to the cranks are the connecting bars 19, said connecting bars at their rear ends being provided with links 20 pivoted at 21 and having attached to their upper ends the reciprocating bars 22, said bars 22 extending at their front ends through openings 23 in the platform 1. Connected to the feet sections 9 of the horse are the rods or links 24, said rods being engaged in staples 25 connected to the sections 9 and at their lower ends pivoted to bars 26, said bars being pivoted at 27 to the reciprocating bars 22. The feet sections 15 of the hind legs of the horse are similarly connected by means of the rods or links 28 to links 29, said links being pivotally connected to the rods 28 at one end and at their opposite ends pivoted at 30 to the reciprocating bars 22. The mechanism for operating the horse is inclosed within a suitable housing 31, and the wheels 32 are mounted on the front and rear axles. A suitable tongue or handle 33 is attached to the frame in any suitable manner so that the toy may be drawn over the floor.

From the foregoing it will be obvious that as the toy is drawn over the floor the legs of the figure of the horse are moved in a natural manner, thus providing an amusing toy for children which is not expensive to manufacture and which can be sold at a low price.

I claim:—

A toy comprising a wheeled frame, the figure of a horse mounted upon said frame, said horse having legs made up of pivoted sections, a cranked front axle, bars pivoted to said cranked axle, reciprocating bars connected thereto, links connected to the foot sections of the horse, links connected to said links and pivoted to the reciprocating bars, and a tongue or handle for moving said toy.

In testimony whereof I affix my signature in presence of two witnesses.

THOMAS HARRIS.

Witnesses:
　SAMUEL D. ROBERTS,
　JOHN ISAAC.